United States Patent
Shao et al.

(10) Patent No.: US 12,333,459 B2
(45) Date of Patent: Jun. 17, 2025

(54) METHODS AND INTERNET OF THINGS SYSTEMS FOR OPTIMIZING METRO OPERATION SCHEDULING IN SMART CITY

(71) Applicant: CHENGDU QINCHUAN IOT TECHNOLOGY CO., LTD., Sichuan (CN)

(72) Inventors: Zehua Shao, Chengdu (CN); Haitang Xiang, Chengdu (CN); Bin Liu, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 212 days.

(21) Appl. No.: 18/149,645

(22) Filed: Jan. 3, 2023

(65) Prior Publication Data

US 2024/0202616 A1   Jun. 20, 2024

(30) Foreign Application Priority Data

Dec. 14, 2022   (CN) .......................... 202211598336.3

(51) Int. Cl.
*G06Q 10/0631* (2023.01)
*G06Q 50/40* (2024.01)

(52) U.S. Cl.
CPC ......... *G06Q 10/0631* (2013.01); *G06Q 50/40* (2024.01)

(58) Field of Classification Search
CPC .. G06Q 10/06313; G06Q 50/40; G06Q 10/04; G06Q 10/0631; G06Q 10/06315; G08G 1/123; G08B 25/016
See application file for complete search history.

(56) References Cited

U.S. PATENT DOCUMENTS

2021/0142670 A1* 5/2021 Kamiya ................. G08G 1/127

FOREIGN PATENT DOCUMENTS

| CN | 208256102 U | * | 12/2018 | |
|---|---|---|---|---|
| CN | 116307448 B | * | 4/2024 | ....... G06Q 10/06312 |
| WO | WO-2023065389 A1 | * | 4/2023 | ........... G06Q 10/047 |

OTHER PUBLICATIONS

Translation of WO 2023065389 A1 (Year: 2021).*

(Continued)

*Primary Examiner* — Jerry O'Connor
*Assistant Examiner* — Michael R Koester
(74) *Attorney, Agent, or Firm* — METIS IP LLC

(57) ABSTRACT

Methods for optimizing metro operation scheduling in a smart city are provided. The method may be realized by an Internet of Things system for optimizing metro operation scheduling in a smart city including a user platform, a service platform, a management platform, a sensor network platform, and an object platform. The method may be executed by the management platform, and may comprises: obtaining, based on the object platform, passenger flow data of at least one metro station related to a target station by the sensor network platform; determining predicted passenger flow data of the target station in a target period of time based on the passenger flow data of the at least one metro station; and determining an operation scheduling scheme of the target station in the target period of time based on the predicted passenger flow data, the operation scheduling scheme including at least a metro departure interval.

18 Claims, 6 Drawing Sheets

(56) References Cited

OTHER PUBLICATIONS

Translation of CN 116307448 B (Year: 2022).*
J. Li, et al. "Practical bus timetable optimization method based on deep reinforcement learning," 2022 4th International Academic Exchange Conference on Science and Technology Innovation (IAECST), Guangzhou, China, 2022, pp. 581-587 https://ieeexplore.ieee.org/document/10062247?source=IQplus (Year: 2022).*

* cited by examiner

500

Determining the metro departure interval in the target period of time through a reinforcement learning model based on the predicted passenger flow data ⟵ 510

Determining the metro departure time based on the metro departure interval ⟵ 520

FIG. 5

METHODS AND INTERNET OF THINGS SYSTEMS FOR OPTIMIZING METRO OPERATION SCHEDULING IN SMART CITY

CROSS-REFERENCE TO RELATED APPLICATION

This application claims priority of Chinese Patent Application No. 202211598336.3, filed on Dec. 14, 2022, the contents of which are entirely incorporated herein by reference.

TECHNICAL FIELD

The present disclosure relates to the field of metro operation, and in particular, to methods and Internet of Things systems for optimizing metro operation scheduling in a smart city.

BACKGROUND

In urban transportation, the metro is widely used as a means of transportation with large passenger capacity and high speed. The metro plays an important role in relieving traffic pressure in cities, and the operation efficiency of the metro usually affects the traffic situation in various areas of the city.

Therefore, it is desirable to provide methods and Internet of Things system for optimizing metro operation scheduling in a smart city, which can optimize metro scheduling, thereby improving the metro operation efficiency and ensuring the smooth flow of urban traffic.

SUMMARY

One or more embodiments of the present disclosure provide a method for optimizing metro operation scheduling in a smart city. The method may be realized by an Internet of Things system for optimizing metro operation scheduling in a smart city. The Internet of Things system for optimizing metro operation scheduling in a smart city may include a user platform, a service platform, a management platform, a sensor network platform, and an object platform. The method may be executed by the management platform, and may comprise: obtaining, based on the object platform, passenger flow data of at least one metro station related to a target station by the sensor network platform; determining predicted passenger flow data of the target station in a target period of time based on the passenger flow data of the at least one metro station; and determining an operation scheduling scheme of the target station in the target period of time based on the predicted passenger flow data, the operation scheduling scheme including at least a metro departure interval.

One or more embodiments of the present disclosure provide an Internet of Things system for optimizing metro operation scheduling in a smart city. The Internet of Things system may comprise a user platform, a service platform, a management platform, a sensor network platform, and an object platform. The management platform may be configured to obtain, based on the object platform, passenger flow data of at least one metro station related to a target station by the sensor network platform; determine predicted passenger flow data of the target station in a target period of time based on the passenger flow data of the at least one metro station; and determine an operation scheduling scheme of the target station in the target period of time based on the predicted passenger flow data, the operation scheduling scheme including at least a metro departure interval.

One or more embodiments of the present disclosure provide a non-transitory computer-readable storage medium storing computer instructions. When reading the computer instructions in the storage medium, a computer may implement the method for optimizing metro operation scheduling in a smart city.

BRIEF DESCRIPTION OF THE DRAWINGS

The present disclosure is further illustrated in terms of exemplary embodiments. These exemplary embodiments are described in detail with reference to the drawings. These embodiments are non-limiting exemplary embodiments, in which like reference numerals represent similar structures, and wherein:

FIG. 5 is a flowchart illustrating an exemplary process for determining a departure time according to some embodiments of the present disclosure.

DETAILED DESCRIPTION

Figure 1:
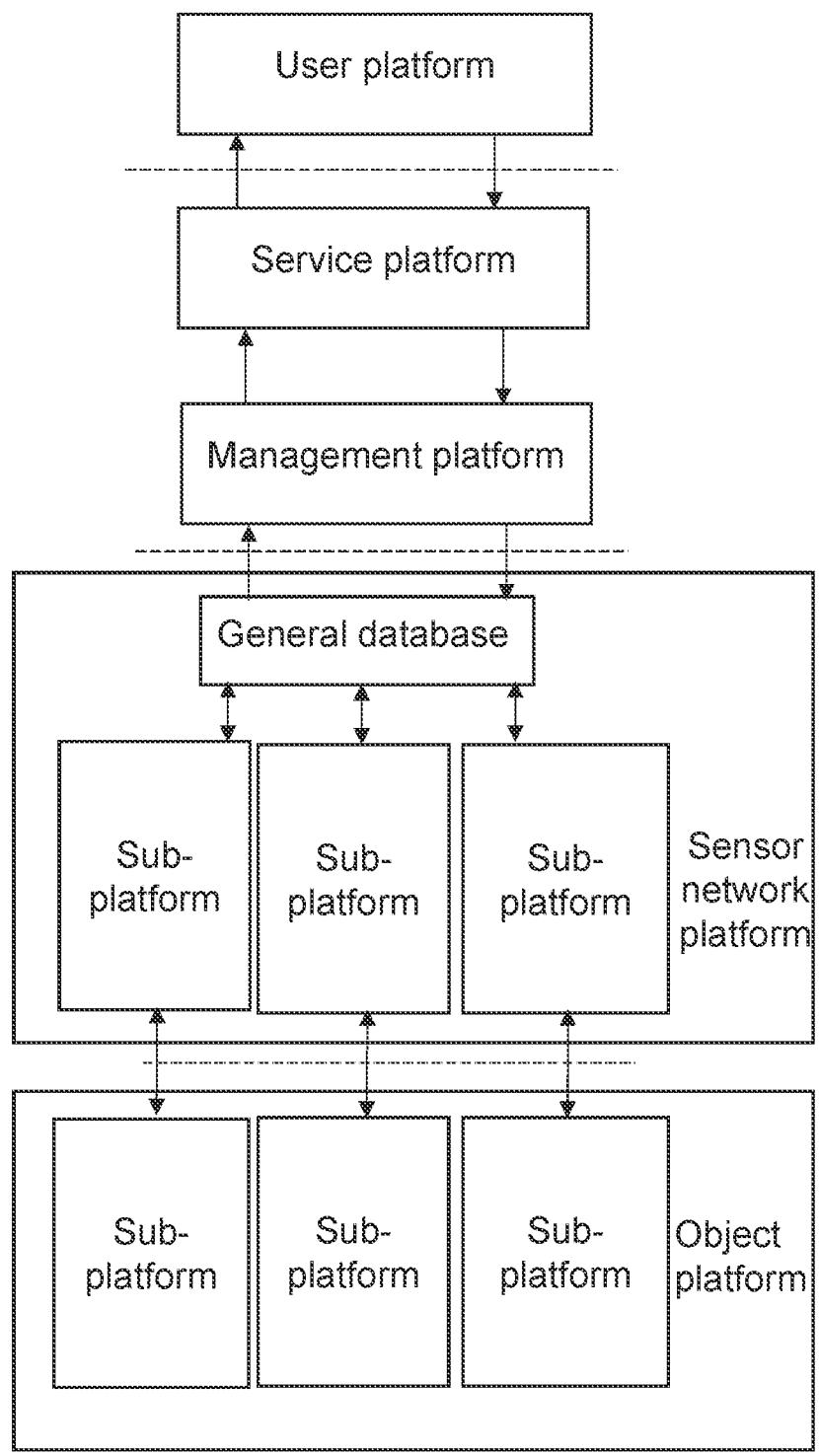
FIG. 1 is a schematic diagram illustrating an exemplary Internet of Things system for optimizing metro operation scheduling in a smart city according to some embodiments of the present disclosure.

In order to more clearly illustrate the technical solutions related to the embodiments of the present disclosure, a brief introduction of the drawings referred to the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

It should be understood that the "system," "device," "unit," and/or "module" used herein are one method to distinguish different components, elements, parts, sections, or assemblies of different levels. However, if other words can achieve the same purpose, the words can be replaced by other expressions.

As used in the disclosure and the appended claims, the singular forms "a," "an," and "the" include plural referents unless the content clearly dictates otherwise; the plural forms may be intended to include singular forms as well. In general, the terms "comprise," "comprises," and/or "comprising," "include," "includes," and/or "including," merely prompt to include steps and elements that have been clearly identified, and these steps and elements do not constitute an exclusive listing. The methods or devices may also include other steps or elements.

The flowcharts used in the present disclosure illustrate operations that the system implements according to the embodiment of the present disclosure. It should be understood that the foregoing or following operations may not necessarily be performed exactly in order. Instead, the operations may be processed in reverse order or simultaneously. Besides, one or more other operations may be added to these processes, or one or more operations may be removed from these processes.

FIG. 1 is a schematic diagram illustrating an exemplary Internet of Things system for optimizing metro operation scheduling in a smart city according to some embodiments of the present disclosure.

It should be understood that the Internet of Things system for optimizing metro operation scheduling in a smart city may be implemented in various ways. As shown in FIG. 1, the Internet of Things system for optimizing metro operation scheduling in a smart city may include a user platform, a service platform, a management platform, a sensor network platform, and an object platform. In some embodiments, the Internet of Things system for optimizing metro operation scheduling in a smart city may be part of or implemented by a processing device.

The user platform may refer to a user-oriented platform. In some embodiments, the user platform may be configured as a terminal device. In some embodiments, the user platform may obtain an input instruction of a user through the terminal, and query the operation scheduling scheme of the target station in the target period of time. In some embodiments, the user platform may issue a metro operation scheduling scheme query instruction to the service platform, receive the operation scheduling scheme uploaded by the service platform, and feed the operation scheduling scheme back to the user.

The service platform may refer to a platform that provides input and output services for the user. In some embodiments, the service platform may be centrally arranged. The centralized arrangement means that the platform receives data uniformly, processes data uniformly, and sends data uniformly. In some embodiments, the service platform may receive the operation scheduling scheme query instruction issued by the user platform and transmit the operation scheduling scheme query instruction to the management platform. The service platform may also receive the operation scheduling scheme uploaded by the management platform and transmit the operation scheduling scheme to the user platform, etc.

The management platform may refer to a platform that overall plans and coordinates connection and collaboration among the functional platforms, and brings together all information of the Internet of Things system for optimizing metro operation scheduling in a smart city. The management platform may provide functions of perception management and control management for the Internet of Things system operation system for optimizing metro operation scheduling in a smart city. In some embodiments, the management platform may be a remote platform controlled by a manager, artificial intelligence, or a preset rule. In some embodiments, the management platform may also be centrally arranged. In some embodiments, the management platform may receive the operation scheduling scheme query instruction issued by the service platform and upload the operation scheduling scheme to the service platform. The management platform may also issue an instruction for querying passenger flow data of each metro station to the sensor network platform, and receive the passenger flow data of each metro station uploaded by the sensor network platform for analysis and processing, and determine the operation scheduling scheme.

The sensor network platform may refer to a functional platform for managing sensor communication. The sensor network platform may realize functions of perceptual information sensor communication and control information sensor communication. In some embodiments, the sensor network platform may be arranged in a front distribution. The front distribution means that the platform is set up with a general platform and a plurality of sub-platforms. The plurality of sub-platforms may store and process data of different types or different receiving objects sent by a lower platform (e.g., the object platform). The general platform may store and process the data of the plurality of sub-platforms after aggregation, and transmit the data to an upper platform (e.g., the management platform). In some embodiments, the sensor network platform may include a general database and a plurality of sensor network sub-platforms. Each sensor network sub-platform may correspond to a region. The region may be determined according to an administrative region of a city, and each region may include various metro stations within the region. In some embodiments, the sensor network platform may be configured as a communication network and a gateway device. Each sensor network sub-platform may be configured as a separate gateway device. In some embodiments, the sensor network sub-platform may obtain the passenger flow data of the metro station from the object platform of the corresponding region. Each sensor network sub-platform may further upload the processed data to the general database of the sensor network platform. The general database may upload the aggregated passenger flow data of each metro station of each region to the management platform.

The object platform may refer to a functional platform for generating the perceptual information. In some embodiments, the object platform may be configured as various types of devices to obtain information. The various devices may include an image obtaining device, a metro entry gate device, a weight sensor, etc. Each device may be uniquely identified and may be deployed at different metro stations of different areas to obtain passenger flow data of each metro station. In some embodiments, the object platform may include a plurality of object sub-platforms. Each object sub-platform may correspond to each of the types of devices in a region. In some embodiments, the object platform sub-platform may receive an instruction issued by the corresponding sensor network sub-platform for obtaining the passenger flow data of each metro station in the region, and upload the passenger flow data of each metro station in the region to the corresponding sensor network sub-platform.

In some embodiments, the Internet of Things system for optimizing metro operation scheduling in a smart city may be applied to a variety of rail transit scenarios, such as metro, intercity railway, international railway, etc. to determine a variety of work plans including operation scheduling management, traffic control, deployment of related staff, etc. It should be noted that the above scenarios are only examples and do not limit the specific application scenario of the Internet of Things system for optimizing metro operation scheduling in a smart city. Those skilled in the art may apply the Internet of Things system for optimizing metro operation scheduling in a smart city to any other suitable scenarios based on what is disclosed in the embodiments.

The Internet of Things system for optimizing metro operation scheduling in a smart city may be applied to the scenario as follows, which is taken as an example to illustrate the Internet of Things system for optimizing metro operation scheduling in a smart city.

The management platform may be configured to obtain, based on the object platform, passenger flow data of at least one metro station related to a target station by the sensor network platform; determine predicted passenger flow data of the target station in a target period of time based on the passenger flow data of the at least one metro station; and determine an operation scheduling scheme of the target station in the target period of time based on the predicted passenger flow data, the operation scheduling scheme including at least a metro departure interval. For further description about the determining the operation scheduling scheme, please refer to FIG. 2 and related description thereof.

In some embodiments, the target station may be a metro station where the passenger flow data is greater than a preset passenger flow threshold. Further description about the target station, please refer to FIG. 2 and related description thereof.

In some embodiments, the management platform may further be configured to determine, based on the passenger flow data of at least one metro station, the predicted passenger flow data of the target station in the target period of time through a passenger flow prediction model. The passenger flow prediction model may be a machine learning model. For further description about the passenger flow prediction model, please refer to FIG. 3 and related description thereof.

In some embodiments, an input of the passenger flow prediction model may further include: collection time information and target period of time information of the target station. The collection time information and the target period of time information both include time information, weather information, and traffic environment information corresponding to a collection time and the target period of time. For further description about the collection time information and the target period of time, please refer to FIG. 3 and related description thereof.

In some embodiments, the management platform may be further configured to determine a predicted passenger flow distribution of the target station in the target period of time at least based on the passenger flow data of the target station and the target period of time. For further description about the determining the predicted passenger flow distribution, please refer to FIG. 4 and related description thereof.

In some embodiments, the operation scheduling scheme may also include a metro departure time. The management platform may also be configured to determine the departure interval in the target period of time through a reinforcement learning model based on the predicted passenger flow data; and determine the departure time based on the departure interval. For further description about the determining the departure time, please refer to FIG. 5 and related description thereof.

In some embodiments, a reward function in the reinforcement learning model may be 0 when the departure interval is smaller than a preset time threshold. In some embodiments, the reinforcement learning model may further include determining a target count of passengers based on the predicted passenger flow distribution. The reward function may be related to the target count of passengers. For further description about the reinforcement learning model, please refer to FIG. 6 and related description thereof.

It should be noted that the above description of the Internet of Things for optimizing metro operation scheduling in a smart city is provided merely for the convenience of illustration, and not intended to limit the present disclosure to the scope of the illustrated embodiments. It can be understood that for those skilled in the art, after understanding the principle of the Internet of Things system, it is possible to combine the modules arbitrarily or form a sub-system to connect with other modules without departing from the principle. For example, the management platform, the user platform, the service platform, the sensor network platform, and the object platform disclosed in FIG. 1 may be different platforms in one system, or may be one platform implementing the functions of the two or more of platforms.

Figure 2:
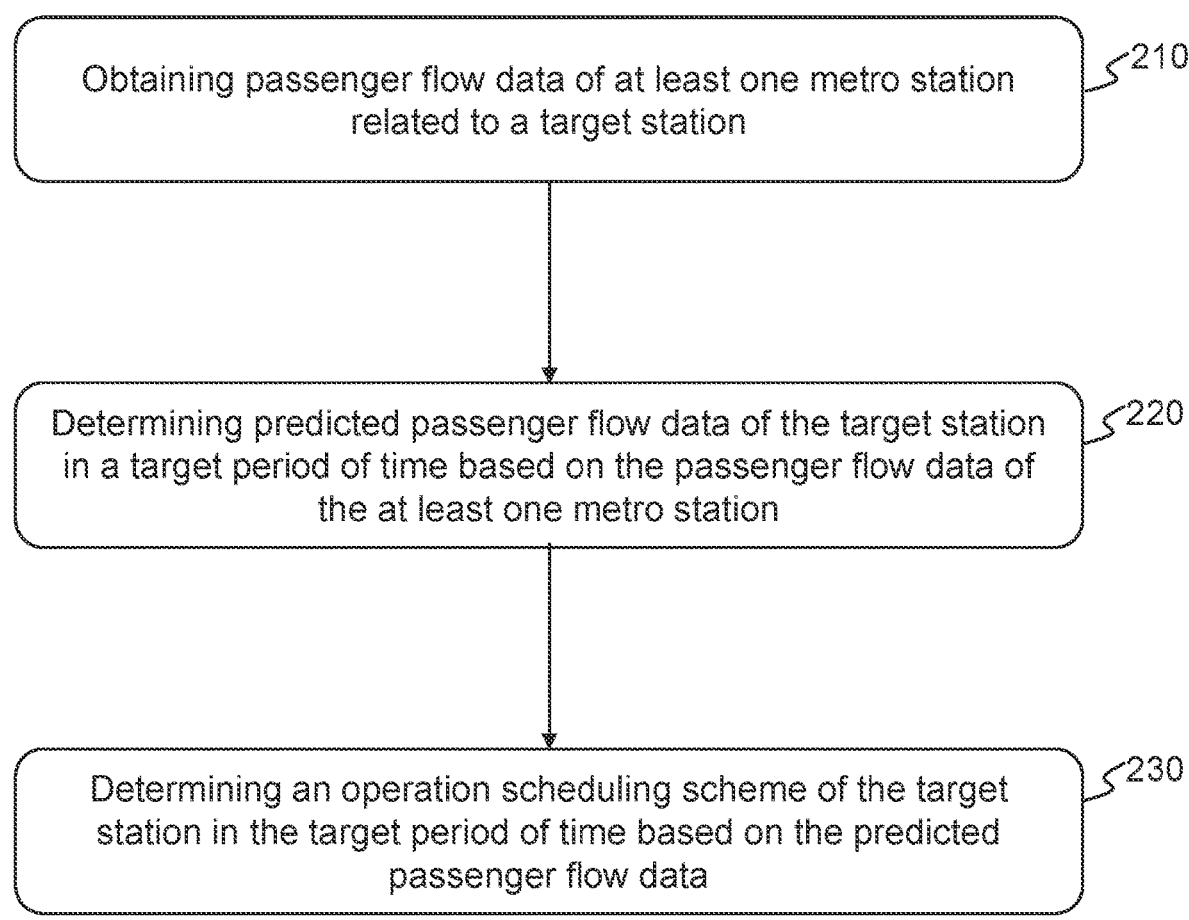
FIG. 2 is a flowchart illustrating an exemplary process of a method for optimizing metro operation scheduling in a smart city according to some embodiments of the present disclosure.

FIG. 2 is a flowchart illustrating an exemplary process of method for optimizing metro operation scheduling in a smart city according to some embodiments of the present disclosure. As shown in FIG. 2, the process 200 may include the following operations. In some embodiments, the process 200 may be performed by a management platform.

In 210, obtaining passenger flow data of at least one metro station related to a target station.

The passenger flow data may refer to a count of persons entering a place per unit time, for example, metro station A may have the passenger flow of 50,000 people in a day. Metro Station B may have a passenger flow of 100,000 people in a week.

The target station may be a metro station where predicted passenger data at a future time needs to be determined. For example, the target station may be an intersection of a plurality of metro lines (i.e., a transfer point). The target station may also be a metro station in a high-traffic region (e.g., a central business district).

In some embodiments, the target station may be a metro station with the passenger flow data greater than a preset passenger flow threshold. It should be understood that the passenger flow data here is an actual passenger flow of the target station. For example, if the preset passenger flow threshold is 50,000 people per day, the passenger flow of metro station A is 34,700 people per day, the passenger flow of metro station B is 64,000 people per day, and the passenger flow of metro station C is 52,900 people per day, the management platform may use the metro stations B and C with the passenger flow data greater than 50,000 people per day as the target stations.

The metro station related to the target station may be the target station itself, another station on a same metro line as the target station, or a station on a different line with a relatively small distance (e.g., smaller than a distance threshold) from the target station. For example, if metro line 1 includes stations A, B, C, D and E, and the target station is C, the metro stations related to the target station may include stations A, B, D and E. As another example, if the management platform sets the distance threshold of 3 km, and the metro stations less than 3 km away from the target station C include metro station L of metro line 3 and metro station W of metro line 5, metro station L and metro station W may be used as the metro stations related to the target station.

In some embodiments, the management platform may obtain passenger flow data in a historical preset period of time based on an object platform. A duration of the historical preset period of time may be set according to an actual need, for example, the past hour, the past day, etc. Exemplarily, the management platform may capture an image through an image capturing device (e.g., a surveillance camera, a drone, etc.) of each metro station configured on the object platform, perform face recognition, and obtain the passenger flow data of the at least one metro station related to the target station. As another example, the management platform may obtain a swipe record from an entry gate device of each metro station configured on the object platform, and obtain the passenger flow data of the at least one metro station related to the target station.

In 220, determining predicted passenger flow data of the target station in a target period of time based on the passenger flow data of the at least one metro station.

The target period of time may be a period of time where the predicted passenger flow data needs to be determined. The target period of time may be at least a period of time in the future, for example, next 2 hours, daily rush hour of the next week, etc.

The predicted passenger flow data may be passenger flow data of the target station in the target period of time. For example, the predicted passenger flow of metro station A in a next day may be 40,000 people. The predicted passenger flow of metro station B in a next week may be 110,000 people.

In some embodiments, the predicted passenger flow data may also be a predicted passenger flow distribution. The predicted passenger flow distribution may include a predicted passenger flow distribution interval and an interval probability. The predicted passenger flow distribution interval may be expressed as $(A_1, A_2, A_3 \ldots, A_n)$. The predicted passenger flow distribution interval may be divided according to the a system default value, an empirical value, a manually-set value, etc. according to an actual need. For example, $A_1$ may represent a range of 0 people to 5000 people, $A_2$ may represent a range of 5000 people to 10000 people, $A_3$ may represent a range of 10000 people to 15000 people . . . . The predicted passenger flow distribution may be expressed as $(p_1, p_2, p_3, \ldots, p_n)$, where $p_1$ represents the interval probability of the interval $A_1$, $p_2$ represents the interval probability of the interval $A_2$, and $p_3$ represents the interval probability of the interval $A_3$. For example, $p_1$ may be 10%, $p_2$ may be 30%, $p_3$ may be 54%, . . . , etc.

Exemplarily, the predicted passenger flow distribution interval may include 0 people to 5,000 people, 5,000 people to 10,000 people, 10,000 people to 15,000 people, and greater than 15,000 people. If the probability of the predicted passenger flow of 0 people to 5000 people is 4%, the probability of the predicted passenger flow of 5000 people to 10000 people is 87%, the probability of the predicted passenger flow of 10000 people to 15000 people is 9%, and the probability of the predicted passenger flow greater than 15000 people is 0% for, the predicted passenger flow distribution may be expressed as (4%, 87%, 9%, 0%).

In some embodiments, the management platform may generate, based on first historical passenger flow data of a plurality of metro stations related to the target station, the historical period of time in which the first historical passenger flow data is located, and second historical passenger flow data of the target station after a same duration as the target period of time, a corresponding table between the first historical passenger flow data and the second historical passenger flow data. It can be understood that the management platform may determine, based on the current passenger flow data of the at least one metro station related to the target station and the current period of time in which the current passenger flow data is located, the second historical passenger flow data corresponding to the first historical passenger flow data that is the same as or similar to the passenger flow data of the at least one metro station related to the target station and the period of time in which the passenger flow data is located as the current predicted passenger flow data.

In some embodiments, the management platform may determine the predicted passenger flow data of the target station in the target period of time based on the passenger flow data of the at least one metro station through a passenger flow prediction model. The passenger flow prediction model may be a machine learning model. For further description about the determining the predicted passenger flow data through the passenger flow prediction model, please refer to FIG. 3 and related description thereof.

In some embodiments, the management platform may also determine the predicted passenger flow distribution of the target station in a target period of time at least based on the passenger flow data of the target station and the target period of time. For further description about the determining the predicted passenger flow distribution, please refer to FIG. 4 and related description thereof.

In some embodiments, the management platform may determine the predicted passenger flow data of the target station in the target period of time based on the passenger flow data of the at least one metro station. Exemplarily, the management platform may analyze and process the passenger flow data of the at least one metro station by modeling or using various data analysis manners to determine the predicted passenger flow data of the target station in the target period of time.

In 230, determining an operation scheduling scheme of the target station in the target period of time based on the predicted passenger flow data.

The operation scheduling scheme may be related to a related scheme for arranging and directing metro operations. In some embodiments, the operation scheduling scheme may include a departure interval, a departure time, etc. of metro of each metro line. The departure interval may be a time interval between two metro trips of a same metro route and in a same direction of travel, e.g., 15 minutes, 45 minutes, etc. The departure time may be a moment when the metro departs from a certain station (e.g., the target station, a starting station).

In some embodiments, the management platform may analyze and process the predicted passenger flow data by modeling or using various data analysis algorithms to and determine the operation scheduling scheme of the target station in the target period of time.

Merely by way of example, the management platform may determine a historical passenger flow data vector corresponding to the historical passenger flow data based on the historical passenger flow data in advance, and generate a mapping relationship based on a historical actual operation scheduling scheme in a historical target period of time of the target station corresponding to each historical passenger flow vector. It can be understood that the management platform determines a corresponding predicted passenger flow data vector to be predicted based on the predicted passenger flow data. Further, the management platform may determine at least one target historical passenger flow data vector from the historical passenger flow data vectors based on a vector distance (e.g., a Euclidean distance) between the predicted passenger flow data vector to be predicted and the historical passenger flow data vector. The management platform may use the operation scheduling scheme corresponding to the at least one target historical passenger flow data vector as the current operation scheduling scheme based on the mapping relationship.

In some embodiments, the management platform may determine the departure interval in the target period of time through a reinforcement learning model based on the predicted passenger flow data; and determine the departure time based on the departure interval. For further description about the determining the departure time and the determining the departure interval through the reinforcement learning model, please refer to FIG. 5 and FIG. 6 and related description thereof.

In some embodiments of the present disclosure, the passenger flow of a target station may be predicted by obtaining the passenger flow data of the metro station, so that a suitable operation scheduling scheme can be determined to optimize the metro departure interval, thereby improving the efficiency of metro operation and avoiding a large number of passengers waiting and stranded at the metro station and nearby areas.

Figure 3:
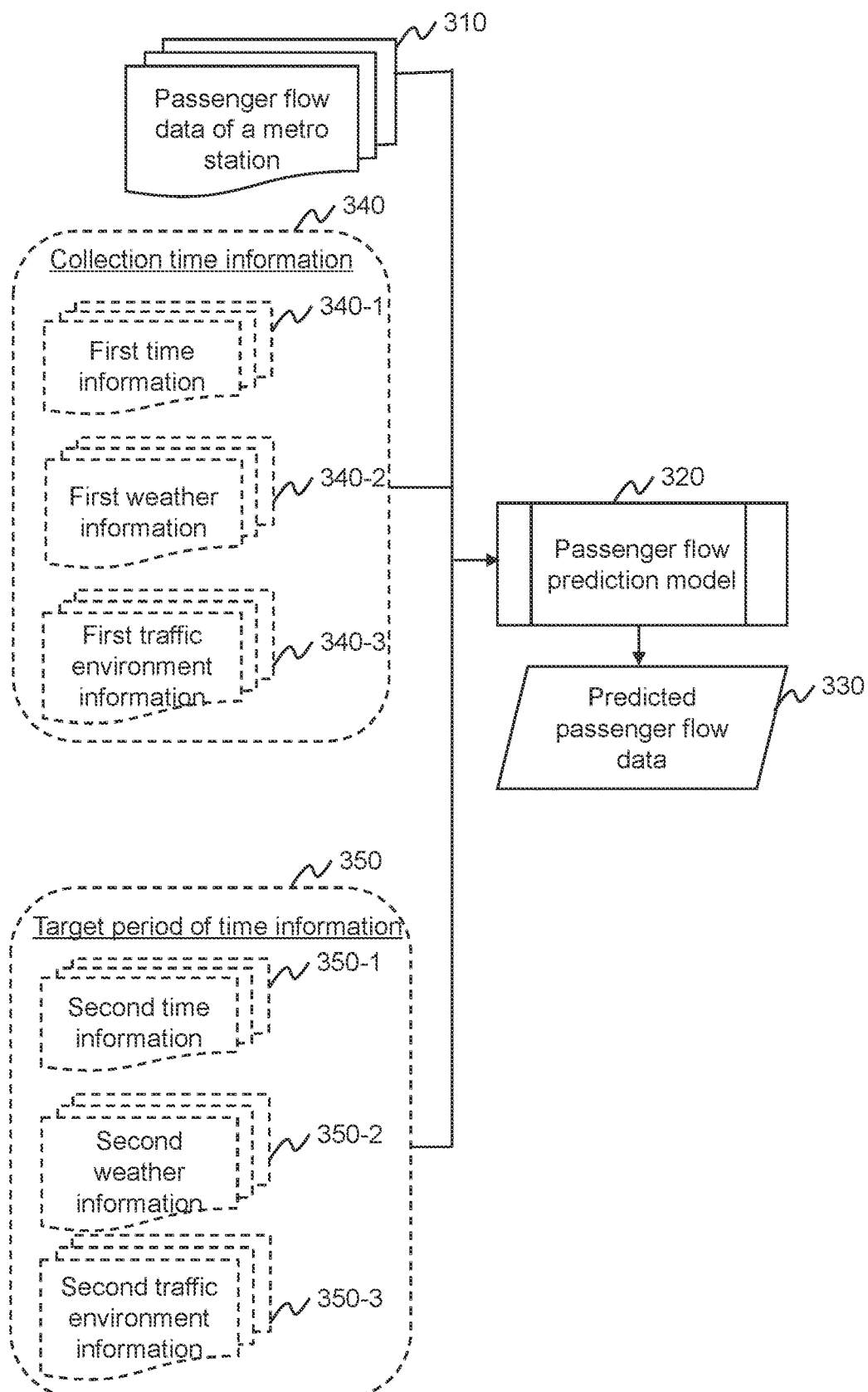
FIG. 3 is an exemplary schematic diagram illustrating determining predicted passenger flow data of the target station in a target period of time based on a passenger flow prediction model according to some embodiments of the present disclosure.

FIG. 3 is an exemplary schematic diagram illustrating determining predicted passenger flow data of the target station in a target period of time based on a passenger flow prediction model according to some embodiments of the present disclosure.

In some embodiments, the management platform may determine the predicted passenger flow data of the target station in the target period of time based on the passenger flow data of at least one metro station through a passenger flow prediction model. The passenger flow prediction model may be a machine learning model. For further description about the passenger flow data of the target station, please refer to FIG. 2 and related description thereof.

The passenger flow prediction model may be used to process the passenger flow data of the at least one metro station to determine the predicted passenger flow data of the target station in the target period of time. The passenger flow prediction model may be a long short-term memory artificial neural networks model, a graph neural networks model, or the like, or any combination thereof.

As shown in FIG. 3, an input of the passenger flow prediction model 320 may include the passenger flow data 310 of the at least one metro station. The passenger flow data of the at least one metro station may include the passenger flow data of the at least one metro station in different period of times on different days. An output of the passenger flow prediction model may include the predicted passenger flow data 330 of the target station in the target period of time.

For example, the input of the passenger flow prediction model 320 may include: the passenger flow data of 2102 people of metro station A from 14:00 to 15:00 on November 1, the passenger flow data of 3784 people of metro station A from 15:00 to 16:00 on November 2, and the passenger flow data of 4117 people of metro station A from 16:00 to 17:00 on November 3. The output of the passenger flow prediction model 320 may be the predicted passenger flow of 3003 people of target station D from 17:00 to 18:00 on November 4.

As another example, the input of the passenger flow prediction model 320 may include: the passenger flow data of 3400 people of metro station A from 14:00 to 15:00 on November 1, the passenger flow data of 5,902 people of metro station B from 14:00 to 15:00 on November 1, and the passenger flow data of 4,665 people of metro station C from 14:00 to 15:00 on November 1. The output of the passenger flow prediction model 320 may be a predicted passenger flow of 4003 people of metro station D in 30 minutes.

In some embodiments, parameters of the passenger flow prediction model 320 may be obtained by training. The management platform may train an initial passenger flow prediction model based on a plurality of sets of training samples with labels. The training samples may be passenger flow data of a plurality of first sample metro stations during a first sample period of time. The label of the training sample may be actual passenger flow data of a second sample metro station during a second sample period of time.

It should be understood that the first sample metro station in the training samples is a metro station related to the second sample metro station. The first sample period of time may be earlier than the second sample period of time. The label may be obtained by the management platform by querying or detecting the actual passenger flow data of the second sample metro station during the second sample period of time.

The plurality of training samples may be input into the initial passenger flow prediction model, a loss function may be constructed based on the output of the initial passenger flow prediction model and the label, parameters of the initial passenger flow prediction model may be updated iteratively based on the loss function, the training may end when the trained model meets a first pre-defined condition, and a trained passenger flow prediction model may be obtained. The first preset condition may include, but is not limited to, that the loss function converges, a loss function value is smaller than a preset value, or a count of training iterations reaches a threshold, etc.

In some embodiments, in addition to the passenger flow data of the at least one metro station, the input of the passenger flow prediction model 320 may also include collection time information 340 and target period of time information 350 of the target station. The passenger flow prediction model may process the passenger flow data of the at least one metro station, the collection time information and the target period of time information of the target station, and output the predicted passenger flow data 330 of the target station in the target period of time.

The collection time information may be relevant information reflecting the target station at a collection time. The collection time may refer to a time when the passenger flow data of at least one metro station is collected on the object platform. In some embodiments, the collection time information 340 may include at least first time information 340-1, first weather information 340-2, and first traffic environment information 340-3.

The first time information may be information that describes the collection time. The first time information may include a moment (e.g., 10:45) or a period of time (e.g., 14:00~15:30) of the time corresponding to the collection time, whether the corresponding time is rush hour, or whether the corresponding time is a weekday or holiday.

The first weather information may be information that reflects a weather condition near the target station at the collection time, for example, heavy rain, light rain, snowfall, sunny days, etc. The first weather information may be determined based on a real-time weather condition.

The first traffic environment information may be information that reflects a traffic condition and an environmental condition near the target station at the collection time. The first traffic environment information may include activity information, congestion information, bus operation information, taxi difficulty information, or any combination thereof of the target station at the collection time.

The activity information may reflect an activity or gathering near the target station in a corresponding period of time (e.g., the collection time, the target period of time, etc.). For example, the activity information may include whether there is a gathering such as a concert, a sports competition, etc. near the target station. The activity information may also include a size of the activity, e.g., 30,000 people.

The congestion information may reflect congestion of a road near the target station in the corresponding period of time. The congestion information may include a traffic congestion degree (e.g., clear, slow, congested, and severely congested). In some embodiments, the management platform may determine the congestion information based on a historical traffic congestion degree that is in a same period of time (e.g., historical rush hour) as the corresponding period of time.

The bus operation information may reflect operation of other public transportation means near the target station in the corresponding period of time. The bus operation information may include a total count of passengers carried by other public transportation means near the target station, e.g., 5,000 people. In some embodiments, the management platform may determine the bus operation information based on a timetable of a bus system.

The taxi difficulty information may reflect difficulty of hailing a cab or other vehicle providing a driving service near the target station in the corresponding period of time. The taxi difficulty information may include a count of people in line, a waiting duration, etc. In some embodiments, the management platform may determine the taxi difficulty information based on a historical average waiting duration for hailing a taxi near the target station that is in a same period of time as the corresponding period of time.

The target period of time information 350 may be relevant information reflecting the target station during the target period of time. The target period of time information may include at least second time information 350-1, second weather information 350-2, and second traffic environment information 350-3.

The second time information may be information that describes the target period of time. The second time information may include a moment (e.g., 10:45) or a period of time (e.g., 14:00~15:30) corresponding to the target period of time, whether the target period of time is rush hour, or whether the target period of time is a weekday or holiday.

The second weather information may be information that reflects the weather condition near the target station during the target period of time, for example, heavy rain, light rain, snowfall, sunny days, etc. The second weather information may be determined based on a weather condition.

The second traffic environment information may be information that reflects the traffic condition and an environmental condition near the target station during the target period of time. Similar to the first traffic environment information, the second traffic environment information may include the activity information, the congestion information, the bus operation information, the taxi difficulty information, or any combination thereof.

In some embodiments, the training samples of the initial passenger flow prediction model may be the passenger flow data of a plurality of third sample metro stations in a third sample period of time, relevant information (e.g., time information, weather information, and traffic environment information in the third sample period of time) of a fourth sample metro station in the third sample period of time, and relevant information of the fourth sample metro station in the fourth sample period of time (e.g., time information, weather information, and traffic environment information). The label of the training sample may be actual passenger flow of the fourth sample metro station in the fourth sample period of time.

It should be understood that the third sample metro station in the training sample is a metro station related to the fourth sample metro station. The third sample period of time may be earlier than the fourth sample period of time. The label may be obtained by the management platform by querying or detecting the actual passenger flow data of the fourth sample metro station during the fourth sample period of time. For further description about the training, please refer to the description of the training of the initial passenger flow prediction model.

In some embodiments of the present disclosure, an actual condition (e.g., a time condition, a weather condition, a predicted traffic environment condition) affecting the passenger flow near the target station may be analyzed through the model, which can make the predicted passenger flow data more accurate.

In some embodiments of the present disclosure, the passenger flow data of the at least one metro station may be analyzed and processed through the model, so that the passenger flow data of the target station may be predicted quickly and accurately, which can facilitate subsequent determination of the metro departure interval, thereby improving the metro operation efficiency.

In some embodiments, the management platform may determine a predicted passenger flow distribution of the target station in the target period of time based on the passenger flow data of the target station. For further description about the passenger flow data of the target station, please refer to FIG. 2 and related description thereof.

In some embodiments, the management platform may analyze and process the passenger flow data of the target station by using various means such as a preset rule, various data analysis algorithms, human experience, etc. to determine the predicted passenger flow distribution of the target station during the target period of time. For example, the management platform may generate, based on third historical passenger flow data of the target station and historical passenger flow distribution after the target period of time, a correspondence table between the third historical passenger flow data and the historical passenger flow distribution in advance. Accordingly, the management platform may determine, based on the passenger flow data of a current target station, the historical passenger flow distribution corresponding to the third historical passenger flow data that is the same as or similar to the passenger flow data of the current target station as the predicted passenger flow distribution of the current target station in the target period of time.

In some embodiments, the management platform may determine the predicted passenger flow distribution of the target station in the target period of time through a passenger flow distribution prediction model based on the passenger flow data of the at least one metro station and the target period of time.

The passenger flow distribution prediction model may be used to analyze the passenger flow data of the target station and the target period of time to determine the predicted passenger flow distribution of the target station in the target period of time. The passenger flow prediction model may be a long short-term memory artificial neural networks model, a graph neural networks model, or the like, or any combination thereof.

Figure 4:
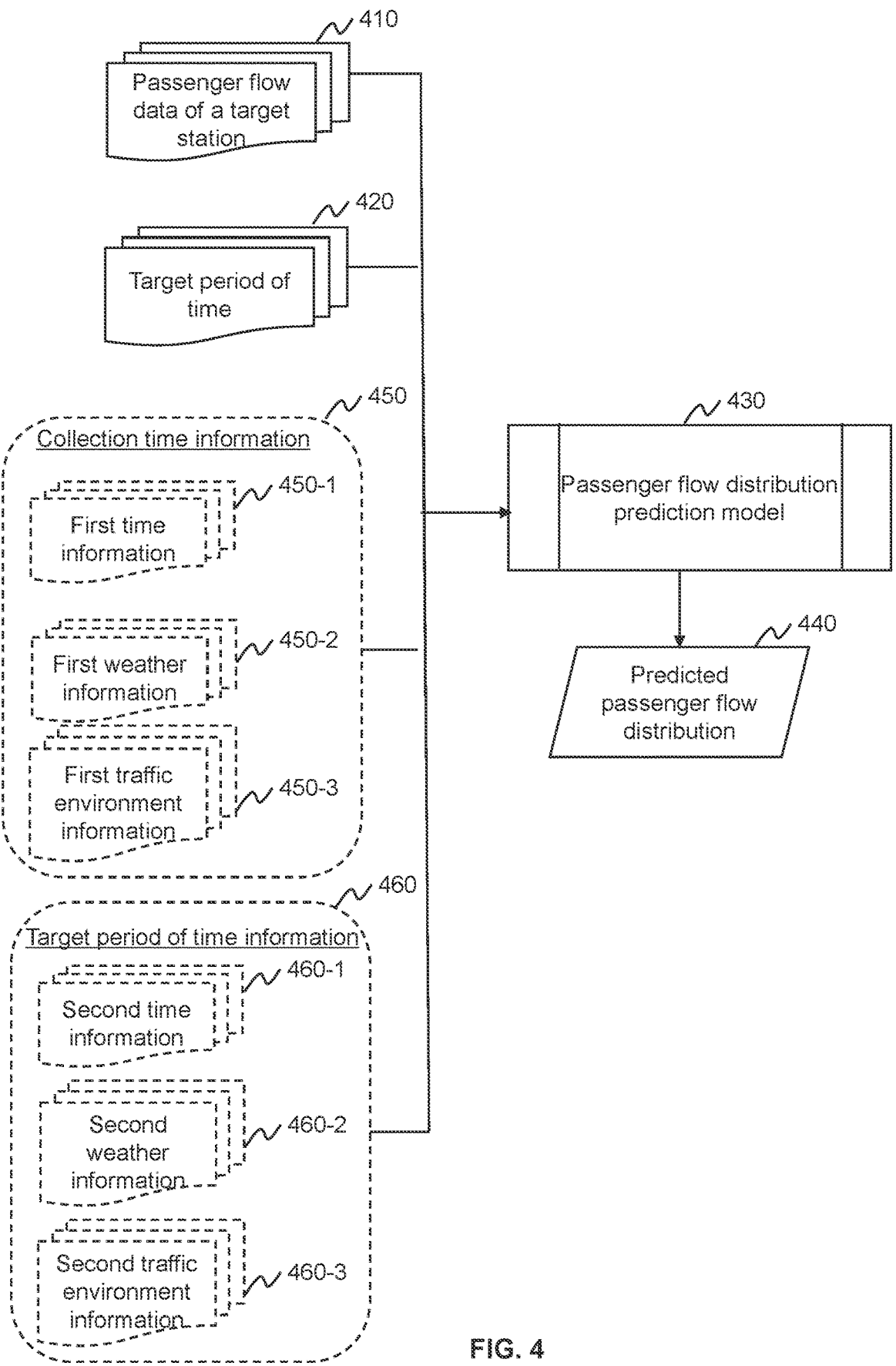
FIG. 4 is an exemplary schematic diagram illustrating determining predicted passenger flow data of the target station in a target period of time based on a passenger flow distribution prediction model according to some embodiments of the present disclosure.

FIG. 4 is an exemplary schematic diagram illustrating determining predicted passenger flow data of the target station in a target period of time based on a passenger flow distribution prediction model according to some embodiments of the present disclosure.

As shown in FIG. 4, an input of the passenger flow distribution prediction model 430 may include passenger flow data 410 and the target period of time 420 of the target station. An output of the passenger flow distribution prediction model 430 may be the predicted passenger flow distribution 440 of the target station in the target period of time.

In some embodiments, parameters of the passenger flow distribution prediction model 430 may be obtained by training. The management platform may train an initial passenger flow distribution prediction model based on a plurality of sets of training samples with labels. The training samples may be passenger flow data of a fifth sample metro station in a fifth sample period of time and the sixth sample period of time. The label of the training sample may be a passenger flow distribution of the fifth sample metro station in the sixth sample period of time.

It should be understood that the fifth sample metro station is a same station as the target station to be predicted. The fifth sample period of time may be earlier than the sixth sample period of time. The label may be obtained by the management platform by querying or detecting the actual passenger flow distribution of the fifth sample metro station in the sixth sample period of time. For further description about the training, please refer to the description of training of an initial passenger flow prediction model.

In some embodiments, the input of the passenger flow distribution prediction model 430 may include, in addition to the passenger flow data 410 and the target period of time 420 of the target station, collection time information 450 and target period of time information 460 of the target station. The passenger flow distribution prediction model may process the passenger flow data of the target station, the target period of time of the target station, the collection time information of the target station, and the target period of time information of the target station, and output the predicted passenger flow distribution 440 of the target station in the target period of time. The collection time information 450 may include at least first time information 450-1, first weather information 450-2, and first traffic environment information 450-3. The target period of time information 460 may include at least second time information 460-1, second weather information 460-2, and second traffic environment information 460-3. For further description about the collection time information and the target period of time information, please refer to FIG. 3 and related description thereof.

In some embodiments, the training samples of the initial passenger flow distribution prediction model may be the passenger flow data of a sixth sample metro station in a seventh sample period of time, relevant information (e.g., time information, weather information, and traffic environment information) of the sixth sample metro station in the seventh sample period of time, an eighth sample period of time, and relevant information (e.g., time information, weather information, and traffic environment information) of the sixth sample metro station in the eighth sample period of time. The label of the training sample may be a passenger flow distribution of the sixth sample metro station in the eighth sample period of time.

It should be understood that the sixth sample metro station in the training sample is a same station as the target station to be predicted. The seventh sample period of time may be earlier than the eighth sample period of time. The label may be obtained by the management platform by querying or detecting the actual passenger flow distribution of the sixth sample metro station during the eighth sample period of time. For further description about the training, please refer to the description of the training of the initial passenger flow distribution prediction model.

In some embodiments of the present disclosure, an actual condition (e.g., a time condition, a weather condition, a traffic environment condition) affecting the passenger flow near the metro station may be analyzed through the model, which can make the predicted passenger flow distribution more accurate.

In some embodiments of the present disclosure, the passenger flow data of the target metro station by analyzed and processed through the model, so that the passenger flow distribution of the target station in the target period of time may be predicted quickly and accurately, which can facilitate subsequent judgment of the metro departure interval, thereby improving the metro operation efficiency.

FIG. 5 is a flowchart illustrating an exemplary process for determining a departure time according to some embodiments of the present disclosure. As shown in FIG. 5, the process 500 may include the following operations. In some embodiments, the process 500 may be executed by the management platform.

In 510, determining the metro departure interval in the target period of time through a reinforcement learning model based on the predicted passenger flow data.

The reinforcement learning model may be used to process the predicted passenger flow data to determine the departure interval in the target period of time.

Figure 6:
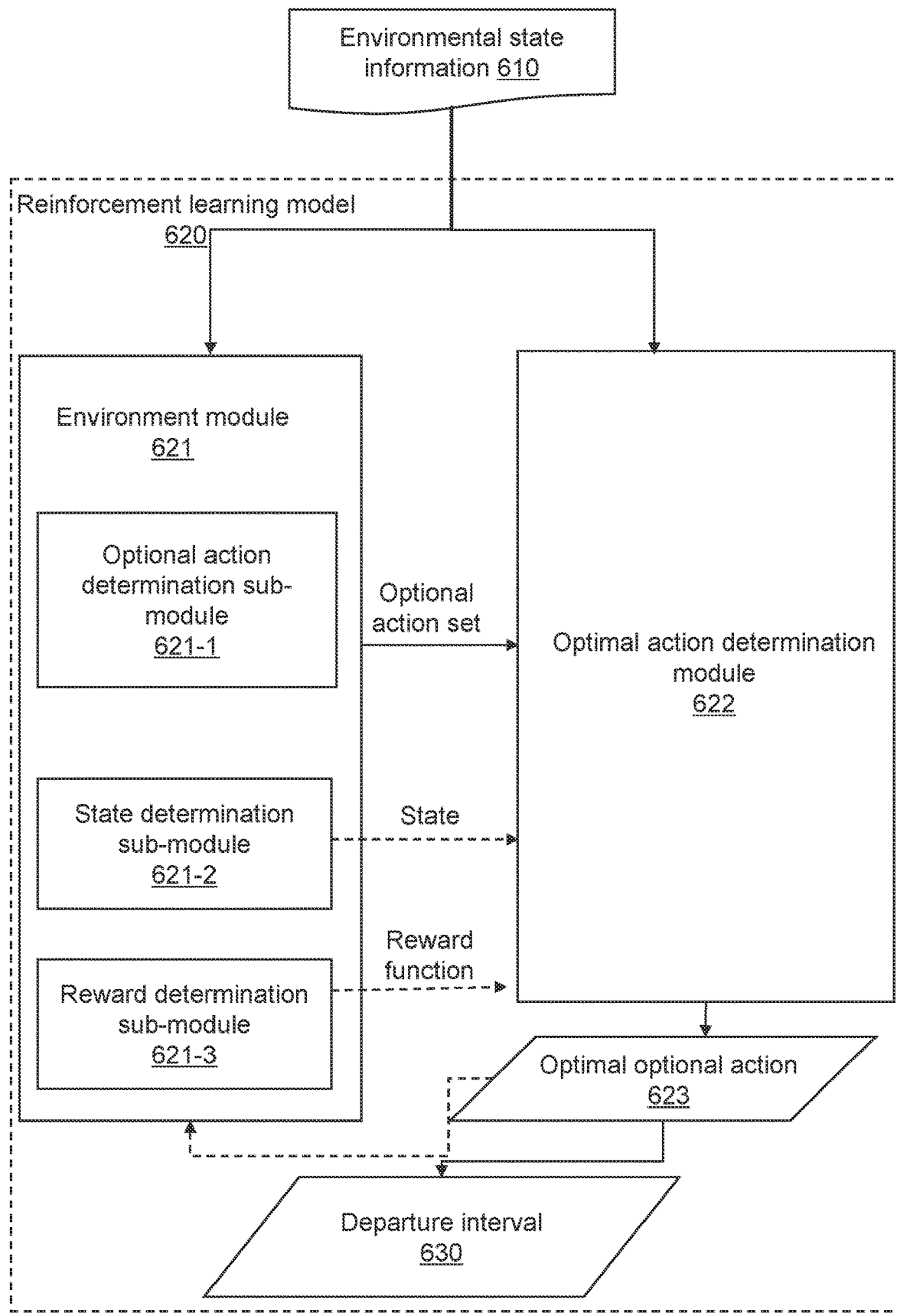
FIG. 6 is an exemplary schematic diagram illustrating determining a departure interval based on a reinforcement learning model according to some embodiments of the present disclosure.

FIG. 6 is an exemplary schematic diagram illustrating determining a departure interval based on a reinforcement learning model according to some embodiments of the present disclosure.

As shown in FIG. 6, the management platform may input environmental state information 610 into the reinforcement learning model 620, and output the departure interval 630 in a target period of time based on the input environmental state information 610. For further description about the departure interval, please refer to FIG. 2 and related description thereof.

The environment state information may be relevant information that describes a state involved in a target station. For example, the environmental state information may include predicted passenger flow data of the target station. For further description about the predicted passenger flow data, please refer to FIG. 2 and related description thereof.

As shown in FIG. 6, the reinforcement learning model 620 may include an environment module 621 and an optimal action determination module 622.

In some embodiments, the environmental state information 610 may be input into the reinforcement learning model 620 when the departure interval 630 in the target period of time is determined based on the reinforcement learning model 620. Within the model, the management platform may input the environmental state information 610 into the environmental module 621. The environmental module 621 may output an optional action set. The management platform may input the environmental state information 610 and the optional action set into an optimal action determination module 622. The optimal action determination module 622 may output an optimal optional action. An departure interval corresponding to the optimal optional action 623 output by the optimal action determination module 622 may be determined as the departure interval 630 in the target period of time, which may be used as an output of the reinforcement learning model 620. For example, if the optimal optional action is a departure interval of 10 minutes, the departure interval in the target period of time may be 10 minutes.

The environment module 621 may include an optional action determination sub-module 621-1, a state determination sub-module 621-2, and a reward determination sub-module 621-3. In the process of predicting the departure interval in the target period of time through the reinforcement learning model 620, the environment module 621 may determine the optional action set by the optional action sub-module 621-1 based on the environment state information 610. During a training process of the reinforcement learning model 620, the state determination sub-module 621-2 and the reward determination sub-module 621-3 of the environment module 621 may be used to determine the environmental state information of a next moment and the reward function, respectively.

The optional action determination sub-module 621-1 may determine the optional action set in the target period of time based on the environmental state information in the target period of time.

The optional action set may refer to a set of actions that can be executed by the management platform in a certain environment state. The action that can be performed may include the departure interval. The departure interval may be different for different environmental states. For example, according to different predicted passenger flow data of the target station in the target period of time, the metro departure interval may be different, and the optional action set may also be different.

In some embodiments, the optional action determination sub-module 621-1 may determine a plurality of departure intervals, based on the environmental state information (i.e., the predicted passenger flow data of the target station) in the target period of time, as the optional action set in the target period of time. For example, the environmental state information in the target period of time may be 3000 people, and the optional action set in the target period of time may include a departure interval of 2 minutes, a departure interval of 4 minutes, a departure interval of 6 minutes, etc.

The state determination sub-module 621-2 may determine environmental state information of the next moment based on the environmental state information in the target period of time and the optimal optional action output by the optimal action determination module 622. For example, if the environmental state information of the target period of time is 1000 people, the optimal optional action output by the optimal action determination module 622 is to dispatch the next train at an interval of 5 minutes, the passenger flow is reduced by 400 people when two consecutive metro trips arrive at the target station and finish carrying passengers, and at this time, passengers newly entering into the target station is 150 people, the state determination sub-module 621-2 may determine that the environmental state information of the next moment to be remaining (1000−400)+150=750 people.

The reward determination sub-module 621-3 may be used to determine the reward function. The reward function may be used to evaluate an extent to which the action performed by the management platform reduces the passenger flow. The extent of decrease of the passenger flow may be determined based on passenger flow in the target station after two consecutive metro trips arrive at the target station at a certain departure interval and finish carrying passengers. The more the passenger flow in the target station decrease compared to the passenger flow before the two metro trips arrive is, the greater the extent of decrease of the passenger flow may be considered by the management platform. For example, a value of the reward function may be relatively high for an action with a high degree of decrease of the passenger flow. The value of the reward function may be relatively low for an action with a low degree of decrease of the passenger flow or an increase instead of a decrease of the passenger flow.

In some embodiments, the reward function may be expressed as a numerical value. In some embodiments, the reward function of the optimal optional action may be related to the degree of decrease of the passenger flow. For example, a preset comparison table may be used to record the reward functions corresponding to various degrees of decrease of the passenger flow, and a corresponding reward function may be determined based on a current degree of the decrease of the passenger flow through the table.

In some embodiments, the reward determination sub-module 621-3 may also determine the reward function based on a set formula. In some embodiments, the reward function in the reinforcement learning model may be 0 when the departure interval is smaller than a preset time threshold. During a metro trip, a certain safety distance (e.g., 1000 m) needs to be maintained between two trips. If the departure interval is too small, a distance between two metro trips may be smaller than the safety distance, which may easily lead to tailgating or other dangerous situations. Therefore, the management platform may need to preset a time threshold of the departure interval. For example, if the preset time threshold is 2 minutes, and if the optimal optional action output by the optimal action determination module is to dispatch the next trip at an interval of 1.5 minutes, the reward function may be 0.

In some embodiments, the reward function may be calculated by the following equation (1):

$$R = \begin{cases} k_1 \times j - k_2 \times \ln(h) & h \geq \delta \\ 0 & h < \delta \end{cases} \quad (2)$$

where R denotes the reward function, and j denotes a count of passengers of the target station. The count of passengers may be determined based on a difference in weight captured by a weight sensor pre-configured on the platform, and may also be determined by face recognition based on images captured by cameras at a platform or inside metro carriages. h denotes the departure interval. δ denotes the preset time threshold. $k_1$ and $k_2$ are preset parameters for adjusting a size of the reward function. The larger the $k_1$ is, which may mean that the reward function brought from selecting a departure interval corresponding to more passengers is larger. The optimal action determination module 622 may prefer to select the departure interval corresponding to more passengers as the departure interval in the target period of time. The larger the $k_2$ is, the smaller the safety risk brought from selecting a departure interval that is too small. $k_1$ and $k_2$ may be determined empirically, for example, both $k_1$ and $k_2$ may be 1.

In some embodiments of the present disclosure, an appropriate metro departure interval may be determined by setting the reward function of an action with the departure interval smaller than the preset time threshold as 0 to avoid occurrence of the dangerous situation such as tailgating due to a too small distance between two metro trips, which can improve safety of metro operation.

In some embodiments, the reward determination sub-module 621-3 may determine a target count of passengers based on the predicted passenger flow distribution. The reward function may be related to the target count of passengers. The reward function may be calculated by the following equation (2):

$$R = k_1 \times (d - g) - k_2 \times \ln(h) \qquad (2)$$

where d denotes an actual count of passengers of the target station, and g denotes the target count of passengers.

In some embodiments, the target count of passengers d may be calculated by the following equation (3):

$$d = \Sigma_i a_i \times p_i \times r_i \qquad (3)$$

where $a_i$ is a median of the predicted passenger flow distribution interval $A_i$, i≤n. For example, if $A_1$ is 0 people to 100 people, $a_1$=50. If $A_2$ is 100 people to 200 people, $a_2$=150, and so on. $p_i$ denotes the interval probability corresponding to the predicted passenger flow distribution interval $A_i$. $r_i$ denotes an ratio of the target count of passengers corresponding to the predicted passenger flow distribution interval $A_i$. The ratio of the target count of passengers may be determined based on historical metro operation records or manual settings. For example, when the passenger flow interval is $A_1$, i.e., when the passenger flow data is less than 100 people, the ratio of the target count of passengers may be 100%. When the passenger flow interval is $A_{10}$, i.e., when the passenger flow data is 900 people to 1,000 people, the ratio of the target count of passengers may be only 50%; it can be understood that there are too many people to carry everyone.

In some embodiments of the present disclosure, since the ratios of the count of passengers corresponding to different passenger flow distributions are different, the reward function may be further optimized by setting different target count of passengers, so that a more accurate departure interval in the target period of time can be determined and the metro operation efficiency can be improved.

The optimal action determination module 622 may determine the optimal optional action 623 based on the environmental state information 610 and the optional action set at the current moment. An input of the optimal action determination module 622 may be the environmental state information 610 and the optional action set. An output of the optimal action determination module 622 may be the optimal optional action 623.

In some embodiments, for each optional action in the optional action set, the optimal action determination module 622 may internally output a recommended value, and the optimal action determination module may determine an optional action with a largest recommended value as the optimal optional action and as the output. In some embodiments, the recommended value may be obtained based on a cumulative value of the reward function. For example, if the values of the historical reward function for a departure interval of 4 minutes are 2.33, 3.25, and 4.11, then recommended value of the departure interval may be 2.33+3.25+4.11=9.69.

In some embodiments, the optimal action determination module 622 may be a machine learning model that can be implemented in various ways, such as a deep neural networks (DNN) model, a convolutional neural networks (CNN) model, a recurrent neural networks (RNN) model, etc.

In some embodiments, the optimal action determination module may be obtained through training based on a reinforcement learning manner, such as Q-Learning, state-action-reward-state-action (Sarsa), deep Q-network (DQN), Policy-Gradients, Actor-Critic, etc. The training samples may be historical environmental state information (i.e., historical passenger flow data of the target station). A label may be the optimal optional action (i.e., an optimal departure interval) corresponding to the historical environmental state information. The training samples may be obtained based on historical data. The label of the training sample may be obtained through the reinforcement learning manner.

The reinforcement model 620 may determine the optimal optional action 623 output by the optimal action determination module 622 as the output of the reinforcement learning model 620, i.e., the departure interval 630.

In 520, determining the metro departure time based on the metro departure interval.

A first metro trip of each metro line each day has an initial departure time. The initial departure time may be a default time set according to an actual need. In some embodiments, when the management platform determines the departure interval, the departure time of the next metro trip may be determined based on the departure time of the previous metro trip. For example, if the departure interval is 5 minutes and the departure time of the previous metro trip is 18:00, the departure time of the next metro trip may be 18:05. In some embodiments, if the next metro trip departs later than an off-running time, the next metro may not depart.

In some embodiments of the present disclosure, the management platform may optimize the departure interval through the reinforcement learning model, so that the departure interval more may be more adaptable to the passenger flow distribution and changes, which can ensure the safety of metro driving and effectively improve the passenger carrying efficiency of the metro.

The embodiments of the present disclosure also provide a non-transitory computer-readable storage medium storing computer instructions. When reading the computer instructions in the storage medium, a computer may implement any one of methods for optimizing metro operation scheduling in a smart city as provided in the embodiments of the present disclosure.

Having thus described the basic concepts, it may be rather apparent to those skilled in the art after reading this detailed disclosure that the foregoing detailed disclosure is intended to be presented by way of example only and is not limiting. Although not explicitly stated here, those skilled in the art may make various modifications, improvements and amendments to the present disclosure. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various parts of this specification are not necessarily all referring to the same embodiment. In addition, some features, structures, or features in the present disclosure of one or more embodiments may be appropriately combined.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

In some embodiments, the numbers expressing quantities or properties used to describe and claim certain embodiments of the present disclosure are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the present disclosure disclosed herein are illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A method for optimizing metro operation scheduling in a smart city realized by an Internet of Things (IoT) system for optimizing metro operation scheduling in a smart city, wherein the IoT system for optimizing metro operation scheduling in a smart city includes a user platform, a service platform, a management platform, a sensor network platform, and an object platform, the IoT system being a part of or implemented by a processing device, the user platform being configured as a terminal device and used to obtain an input instruction of a user through the terminal device, query an operation scheduling scheme of a target station in a target period of time, issue a metro operation scheduling scheme query instruction to the service platform, receive the operation scheduling scheme uploaded by the service platform, and feed the operation scheduling scheme back to the user, the service platform being used to provide input and output services for the user, receive data uniformly, process the data uniformly, and send the data uniformly, the management platform being used to overall plans and coordinates connection and collaboration among the user platform, the service platform, the management platform, the sensor network platform, and the object platform, and bring together all information of the IoT system, the sensor network platform being configured as a communication network and a gateway device and used to realize functions of perceptual information sensor communication and control information sensor communication, the object platform being configured as various types of devices to obtain information including an image obtaining device, a metro entry gate device, a weight sensor and used to generate the perceptual information, the method being executed by the management platform, and the method comprises:

obtaining, based on the object platform, passenger flow data of at least one metro station related to the target station by the sensor network platform;

determining predicted passenger flow data of the target station in the target period of time based on the passenger flow data of the at least one metro station through a passenger flow prediction model, the passenger flow prediction model being a graph neural networks model, wherein an input of the passenger flow prediction model further includes collection time information and target period of time information of the target station, an output of the passenger flow prediction model includes the predicted passenger flow data of the target station in the target period of time, wherein the collection time information and the target period of time information both include time information, weather information, and traffic environment information corresponding to a collection time and the target period of time;

the passenger flow prediction model is obtained through a first training based on a plurality of first training samples with first labels, wherein the first training samples include passenger flow data of a plurality of first sample metro stations during a first sample period of time, the first labels include actual passenger flow data of a second sample metro station during a second sample period of time, wherein the first sample metro station in the first training samples is a metro station related to the second sample metro station, the first labels are obtained by the management platform by querying or detecting the actual passenger flow data of the second sample metro station during the second sample period of time;

the first training includes: inputting the plurality of first training samples with first labels into an initial passenger flow prediction model, constructing a first loss function based on the first labels and output results of the initial passenger flow prediction model, updating parameters of the initial passenger flow prediction model based on the first loss function; and obtaining the passenger flow prediction model until the first loss function of the initial passenger flow prediction model meeting a first preset condition, wherein the first preset condition includes a convergence of the first loss function, a loss function value being smaller than a preset value, and a number of iterations reaching a first threshold;

determining a predicted passenger flow distribution of the target station in the target period of time at least based on the passenger flow data of the target station and the target period of time through a passenger flow distribution prediction model, wherein the passenger flow distribution includes a predicted passenger flow distribution interval and an interval probability, and the passenger flow distribution prediction model is a graph neural networks model;

determining the operation scheduling scheme of the target station in the target period of time based on the predicted passenger flow data, the operation scheduling scheme including at least a metro departure interval;

uploading the operation scheduling scheme to the service platform;

transmitting, based on the service platform, the operation scheduling scheme to the user platform; and feeding, based on the user platform, the operation scheduling scheme back to the user.

2. The method of claim 1, further comprising:
transmitting the operation scheduling scheme to the service platform by the management platform; and
transmitting the operation scheduling scheme to the user platform by the service platform.

3. The method of claim 1, wherein
the sensor network platform includes a general database and a plurality of sub-platforms, the sub-platforms are configured with gateway devices, and the sub-platforms upload data obtained based on the object platform to the general database.

4. The method of claim 1, wherein
the target station is a metro station with the passenger flow data greater than a preset passenger flow threshold, and
the at least one metro station related to the target station includes the target station itself, another station on a same metro line as the target station, or a station on a different line with a distance being smaller than a distance threshold from the target station.

5. The method of claim 1, wherein the operation scheduling scheme further includes a metro departure time; and
the determining the operation scheduling scheme of the target station in the target period of time based on the predicted passenger flow data includes:
determining the metro departure interval in the target period of time through a reinforcement learning model based on the predicted passenger flow data; and
determining the metro departure time based on the metro departure interval.

6. The method of claim 5, wherein a reward function in the reinforcement learning model is 0 when the metro departure interval is smaller than a preset time threshold.

7. The method of claim 6, wherein the reinforcement learning model further includes: determining, based on a predicted passenger flow distribution, a target count of passengers, the reward function being related to the target count of passengers.

8. The method of claim 5, wherein
the reinforcement learning model includes an environment module and an optimal action determination module, wherein;
an input of the environment module includes environmental state information, an output of the environmental module includes an optional action set, the environment module includes an optional action determination sub-module, a state determination sub-module, and a reward determination sub-module, wherein
the optional action determination sub-module is used to determine the optional action set based on the environmental state information, the state determination sub-module is used to determine the environmental state information, and the reward determination sub-module is used to determine the reward function, wherein the optional action set refers to a set of actions that can be executed by the management platform, and the set of actions that can be executed by the management platform include the metro departure interval;
the optimal action determination module is a graph neural networks model, wherein
an input of the optimal action determination module further includes the environmental state information and the optional action set, an output of the optimal action determination module includes an optimal optional action;
the optimal action determination module is obtained through a third training using a reinforcement learning manner based on a plurality of third training samples with third labels, wherein the reinforcement learning manner includes Q-Learning, state-action-reward-state-action (Sarsa), deep Q-network (DQN), Policy-Gradients, Actor-Critic, the third training samples include historical passenger flow data of the target station, the third labels include an optimal departure interval corresponding to historical environmental state information, wherein the third training samples are obtained based on historical data, and the third labels are obtained through the reinforcement learning manner.

9. A non-transitory computer-readable storage medium storing computer instructions, wherein when reading the computer instructions in the storage medium, a computer implements the method for optimizing metro operation scheduling in a smart city according to claim 1.

10. The method of claim 1, wherein
an input of the passenger flow distribution prediction model further includes the collection time information and the target period of time information of the target station, an output of the passenger flow distribution prediction model includes the predicted passenger flow distribution of the target station in the target period of time;
the passenger flow distribution prediction model is obtained through a second training based on a plurality of second training samples with second labels, wherein the second training samples include passenger flow data of a fifth sample metro station in a fifth sample period of time and a sixth sample period of time, the second labels include a passenger flow distribution of the fifth sample metro station in the sixth sample period of time, wherein the fifth sample metro station is a same station as the target station, the fifth sample period of time is earlier than the sixth sample period of time, and the second labels are obtained by the management platform by querying or detecting an actual passenger flow distribution of the fifth sample metro station in the sixth sample period of time;

the second training includes: inputting the plurality of second training samples with second labels into an initial passenger flow distribution prediction model, constructing a second loss function based on the second labels and output results of the initial passenger flow distribution prediction model updating parameters of the initial passenger flow distribution prediction model based on the second loss function; and obtaining the passenger flow distribution prediction model until the second loss function of the initial passenger flow prediction distribution model meeting a second preset condition, wherein the second preset condition includes a convergence of the second loss function, a loss function value being smaller than a preset value, and a number of iterations reaching a second threshold.

11. An Internet of Things system for optimizing metro operation scheduling in a smart city comprising a user platform, a service platform, a management platform, a sensor network platform, and an object platform, the Internet of Things system being a part of or implemented by a processing device, the user platform being configured as a terminal device and used to obtain an input instruction of a user through the terminal device, query an operation scheduling scheme of a target station in a target period of time, issue a metro operation scheduling scheme query instruction to the service platform, receive the operation scheduling scheme uploaded by the service platform, and feed the operation scheduling scheme back to the user, the service platform being used to provide input and output services for the user, receive data uniformly, process the data uniformly, and send the data uniformly, the management platform being used to overall plans and coordinates connection and collaboration among the user platform, the service platform, the management platform, the sensor network platform, and the object platform and bring together all information of the Internet of Things system, the sensor network platform being configured as a communication network and a gateway device and used to realize functions of perceptual information sensor communication and control information sensor communication, the object platform being configured as various types of devices to obtain information including an image obtaining device, a metro entry gate device, a weight sensor and used to generate the perceptual information, wherein the management platform is further configured to:

obtain, based on the object platform, passenger flow data of at least one metro station related to the target station by the sensor network platform;

determine predicted passenger flow data of the target station in the target period of time based on the passenger flow data of the at least one metro station through a passenger flow prediction model, the passenger flow prediction model being a graph neural networks model, wherein an input of the passenger flow prediction model further includes collection time information and target period of time information of the target station, an output of the passenger flow prediction model includes the predicted passenger flow data of the target station in the target period of time, wherein the collection time information and the target period of time information both include time information, weather information, and traffic environment information corresponding to a collection time and the target period of time;

the passenger flow prediction model is obtained through a first training based on a plurality of first training samples with first labels, wherein the first training samples include passenger flow data of a plurality of first sample metro stations during a first sample period of time, and the first labels include actual passenger flow data of a second sample metro station during a second sample period of time, wherein the first sample metro station in the first training samples is a metro station related to the second sample metro station, the first labels are obtained by the management platform by querying or detecting the actual passenger flow data of the second sample metro station during the second sample period of time;

the first training includes: inputting the plurality of first training samples with first labels into an initial passenger flow prediction model, constructing a first loss function based on the first labels and output results of the initial passenger flow prediction model, updating parameters of the initial passenger flow prediction model based on the first loss function; and obtaining the passenger flow prediction model until the first loss function of the initial passenger flow prediction model meeting a first preset condition, wherein the first preset condition includes a convergence of the first loss function, a loss function value being smaller than a preset value, and a number of iterations reaching a first threshold;

determine a predicted passenger flow distribution of the target station in the target period of time at least based on the passenger flow data of the target station and the target period of time through a passenger flow distribution prediction model, wherein the passenger flow distribution includes a predicted passenger flow distribution interval and an interval probability, and the passenger flow distribution prediction model is a graph neural networks model;

determine an operation scheduling scheme of the target station in the target period of time based on the predicted passenger flow data, the operation scheduling scheme including at least a metro departure interval;

uploading the operation scheduling scheme to the service platform;

transmitting, based on the service platform, the operation scheduling scheme to the user platform; and feeding, based on the user platform, the operation scheduling scheme back to the user.

12. The Internet of Things system of claim 11, wherein the management platform is configured to transmit the operation scheduling scheme to the service platform; and the service platform is configured to transmit the operation scheduling scheme to the user platform.

13. The Internet of Things system of claim 11, wherein the sensor network platform includes a general database and a plurality of sub-platforms, the sub-platforms are configured with gateway devices, and the sub-platforms upload data obtained based on the object platform to the general database.

14. The Internet of Things system of claim 11, wherein the target station is a metro station with the passenger flow data greater than a preset passenger flow threshold, and
the at least one metro station related to the target station includes the target station itself, another station on a same metro line as the target station, or a station on a different line with a distance being smaller than a distance threshold from the target station.

15. The Internet of Things system of claim 11, wherein the operation scheduling scheme also includes a metro departure time; and
the management platform is further configured to:
determine the metro departure interval in the target period of time through a reinforcement learning model based on the predicted passenger flow data; and
determine the metro departure time based on the metro departure interval.

16. The Internet of Things system of claim 15, wherein a reward function in the reinforcement learning model is 0 when the metro departure interval is smaller than a preset time threshold.

17. The Internet of Things system of claim 15, wherein the reinforcement learning model includes an environment module and an optimal action determination module, wherein;
an input of the environment module includes environmental state information, an output of the environmental module includes an optional action set, the environment module includes an optional action determination sub-module, a state determination sub-module, and a reward determination sub-module, wherein
the optional action determination sub-module is used to determine the optional action set based on the environmental state information, the state determination sub-module is used to determine the environmental state information, and the reward determination sub-module is used to determine the reward function, wherein the optional action set refers to a set of actions that are executed by the management platform, and the set of actions that are executed by the management platform include the metro departure interval;
the optimal action determination module is a graph neural networks model, wherein
an input of the optimal action determination module further includes the environmental state information and the optional action set, an output of the optimal action determination module includes an optimal optional action;
the optimal action determination module is obtained through a third training using a reinforcement learning manner based on a plurality of third training samples with third labels, wherein the reinforcement learning manner includes Q-Learning, state-action-reward-state-action (Sarsa), deep Q-network (DQN), Policy-Gradients, Actor-Critic, the third training samples include historical passenger flow data of the target station, the third labels include an optimal departure interval corresponding to historical environmental state information, wherein the third training samples are obtained based on historical data, and the third labels are obtained through the reinforcement learning manner.

18. The Internet of Things system of claim 11, wherein
an input of the passenger flow distribution prediction model further includes the collection time information and the target period of time information of the target station, an output of the passenger flow distribution prediction model includes the predicted passenger flow distribution of the target station in the target period of time;
the passenger flow distribution prediction model is obtained through a second training based on a plurality of second training samples with second labels, wherein the second training samples include passenger flow data of a fifth sample metro station in a fifth sample period of time and a sixth sample period of time, the second labels include a passenger flow distribution of the fifth sample metro station in the sixth sample period of time, wherein the fifth sample metro station is a same station as the target station, the fifth sample period of time is earlier than the sixth sample period of time, and the second labels are obtained by the management platform by querying or detecting an actual passenger flow distribution of the fifth sample metro station in the sixth sample period of time;
the second training includes: inputting the plurality of second training samples with second labels into an initial passenger flow distribution prediction model, constructing a second loss function based on the second labels and output results of the initial passenger flow distribution prediction model updating parameters of the initial passenger flow distribution prediction model based on the second loss function; and obtaining the passenger flow distribution prediction model until the second loss function of the initial passenger flow prediction distribution model meeting a second preset condition, wherein the second preset condition includes a convergence of the second loss function, a loss function value being smaller than a preset value, and a number of iterations reaching a second threshold.

* * * * *